United States Patent
Muranaka et al.

(10) Patent No.: US 12,181,737 B2
(45) Date of Patent: Dec. 31, 2024

(54) OPTICAL SWITCHING APPARATUS

(71) Applicant: Nippon Telegraph and Telephone Corporation, Tokyo (JP)

(72) Inventors: Yusuke Muranaka, Musashino (JP); Yohei Sakamaki, Musashino (JP); Toshikazu Hashimoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 283 days.

(21) Appl. No.: 17/766,454

(22) PCT Filed: Oct. 11, 2019

(86) PCT No.: PCT/JP2019/040295
§ 371 (c)(1),
(2) Date: Apr. 4, 2022

(87) PCT Pub. No.: WO2021/070378
PCT Pub. Date: Apr. 15, 2021

(65) Prior Publication Data
US 2023/0097851 A1     Mar. 30, 2023

(51) Int. Cl.
*G02F 1/035* (2006.01)
*G02B 6/35* (2006.01)

(52) U.S. Cl.
CPC .............. *G02F 1/035* (2013.01); *G02B 6/356* (2013.01); *G02B 6/354* (2013.01); *G02B 6/3546* (2013.01); *G02B 6/3556* (2013.01)

(58) Field of Classification Search
CPC .... G02B 6/354; G02B 6/3546; G02B 6/3556; G02B 6/356; G02F 1/035
See application file for complete search history.

(56) References Cited

U.S. PATENT DOCUMENTS 10,958,339 B2 *  3/2021  Menard .............. H04Q 11/0005
2014/0355933 A1 * 12/2014  Yuan .................. G02B 6/3556
                                                            385/18

FOREIGN PATENT DOCUMENTS

| CN | 207994724 U | 10/2018 |
| JP | H06-59294 A | 3/1994 |
| JP | 2019-47233 A | 3/2019 |

OTHER PUBLICATIONS

Hiroaki Harai et al., *Optical Packet and Circuit Integrated Networks and Software Defined Networking Extension*, Journal of Lightwave Technology, vol. 32, No. 16, 2014, pp. 2751-2759.

* cited by examiner

*Primary Examiner* — Daniel Petkovsek
(74) *Attorney, Agent, or Firm* — Workman Nydegger

(57) ABSTRACT

A low-loss optical switch device with a smaller number of ports for an optical switch in a network and node device capable of transmitting OCS-type and OPS-type optical signals is provided. The optical switch device includes: a high-speed add/drop optical switch composed of a plurality of optical switches, the optical switch having an optical waveguide structure made of a material whose refractive index or absorption coefficient changes on the order of nanoseconds, and the optical switch changing the refractive index or the absorption coefficient to perform switching of both OCS optical signals, which are optical-circuit-switching-type optical signals, and OPS optical signals, which are optical-packet-switching-type optical signals; and a plurality of circulators connected to an input port and an output port of the high-speed add/drop optical switch.

13 Claims, 14 Drawing Sheets

OPTICAL SWITCHING APPARATUS

TECHNICAL FIELD

The present invention relates to an optical switch device, and more particularly, to an optical switch device which is an important optical component for supporting a large-capacity optical communication network.

BACKGROUND ART

In recent years, in order to cope with the rapid increase in communication traffic, the speed and capacity of optical communication networks have been increased. The network is composed of a plurality of links and nodes, and research and development for high-speed, large-capacity communication is being carried out in each of them. While the speed of signals and the multiplexing of wavelengths are increasing in links, a technology of flexibly changing the route that connects nodes in order to realize efficient traffic in nodes has become important. Various transmission methods are being studied as a node technology. An optical switching technology that does not require optical-to-electrical conversion is an effective technology in terms of power consumption and delay in network equipment, and an optical transmission method mainly on an optical switching technology has been actively studied.

Among them, an optical circuit switching (OCS) method and an optical packet switching (OPS) method have contradictory characteristics, and data and operations suitable for respective methods are considered.

In the OCS method, a link is established between specific nodes, and data can be transmitted continuously. In order to establish a link, an optical path is generally established by occupying a specific wavelength band, but occupying the wavelength of a link hinders transmission from other nodes. The OCS method is suitable when high reliability is required because there is little packet loss, or when a large amount of data has to be transmitted stably.

On the other hand, in the OPS method, connectionless transmission is possible without establishing a link between nodes. It is common to assign labels to optical packets to be transmitted in advance and transmit the optical packets on the basis of the labels while considering collision avoidance at each node. The OPS method is suitable for a case where the traffic fluctuation of transmission data is large or for data that requires low delay. As illustrated in NPL 1, flexible networks using combination of these two methods are promising for future large-capacity optical communication networks, and research on node technology for realizing them is underway.

As an optical switching technology, it is required to switch an optical signal as light at high speed without requiring optical-to-electrical conversion. As such optical switches, thermo-optic (TO) switches built on a planar lightwave circuit (PLC), switches using an InP-based electro absorption modulator (EAM), Mach-Zehnder interferometer (MZI), and a semiconductor optical amplifier (SOA), LiNbO$_3$-based phase modulator-type switches, and the like have been researched and developed. As a conventional technology for forming a 1×N optical switch, for example, a 2×2 optical switch element illustrated in PTL 1 has been proposed.

FIG. 1 illustrates a perspective view of a conventional 2×2 optical switch element. The 2×2 optical switch element of FIG. 1 is a directional coupler-type optical switch element, and is configured such that an optical input unit (I in the figure), an optical switch unit (II in the figure), an optical output unit (III in the figure), and a light absorption unit (IV in the figure) are provided on an n-InP substrate.

More specifically, in the conventional 2×2 optical switch element, an i-MQW layer 5, an i-InP clad layer 4, and a p-InP clad layer 3 are laminated in this order on an n-InP substrate 6, and the p-InP clad layer 3 is formed in a thin wire shape in such a structure as illustrated in FIG. 1. Further, a p$^+$-InGaAs cap layer 2 and p-type electrodes 1, 10 and 11 are formed in this order on one p-InP clad layer 3 of the optical switch unit II and on both p-InP clad layers 3 of the light absorption unit IV. An n-type electrode 7 is formed on the back surface of the n-InP substrate 6. Further, electrical separation grooves 9 are provided at both ends of the optical switch unit II and the light absorption unit IV on which the electrodes are formed.

The input signal light passes through a portion of the i-MQW layer 5 located below the p-InP clad layer 3 formed in a thin wire shape. Hereinafter, the i-MQW layers 5 located below the p-InP clad layers 3 provided in the optical input unit I, the optical switch unit II, the optical output unit III, and the light absorption unit IV will be referred to as an input waveguide, an optical switch waveguide, an output waveguide, and a light absorption waveguide, respectively.

The input signal light is input to one of the input waveguides and guided to the optical switch waveguide. In the optical switch waveguide, a desired voltage is applied between the p-type electrode 1 and the n-type electrode 7 provided in the optical switch unit II, whereby the refractive index of the optical switch waveguide below the p-type electrode 1 is changed by the quantum confined stark effect (QCSE) due to a multiple quantum well (MQW) structure, for example. In this way, the signal light is output from only one of the optical switch waveguides. That is, the optical path is switched.

In the light absorption unit IV, a desired electric field is applied between the n-type electrode 7 and the p-type electrode 1 provided in a light absorption waveguide different from the light absorption waveguide to which the signal light is input. As a result, the crosstalk light leaked from the optical switch waveguide is absorbed by the optical absorption waveguide, while the signal light output from the optical switch waveguide is guided to the output waveguide (C or D in FIG. 1). As described above, by providing the light absorption unit IV, an optical switch element capable of reducing the influence of light leakage from the optical switch waveguide is realized.

In order to realize a network that integrates the OPS method and the OCS method, it is necessary to adapt to the existing reconfigurable optical add/drop multiplexer (ROADM) network technology. A wavelength selective switch (WSS) is used as an optical switch in ROADM of a ring network, but a node is required to have a WSS function and a high-speed optical switch function. Since WSS alone cannot handle both OPS and OCS signals, it is necessary to realize a new node technology that realizes them.

When support for the OPS method is enabled, it is necessary to switch between optical packets, so that the optical switch is required to have high speed. In order to enable high-speed operation of optical switches, a structure in which carriers are injected into a semiconductor such as InP or Si and switching is performed by an electro-optical effect is generally used. However, since the semiconductor waveguide has strong optical confinement, the connection loss with an optical fiber is large, and the propagation loss tends to increase due to the absorption of carriers and the like. The loss in node devices can be compensated by an amplifier such as an Erbium-doped fiber amplifier (EDFA), but it is not desirable because it causes deterioration in the transmission signal quality. Further, the loss increases as the number of ports on the optical switch is expanded according to the function of the node device. Since the port configuration of the optical switch is related to the network and node configuration to be applied, it is an important issue to realize a low loss for the optical switch that meets the performance requirements.

In high-speed switching, it is necessary to perform a destination recognition process at high speed in addition to the high-speed operation of the optical switch element. This is achieved by adding destination label information and the like to the transmission signal and reading the label before inputting to the optical switch element. Even if the optical switch element is directionless, since label recognition is required, it is not directionless in the node device. As illustrated in FIG. 2, since an optical switch subsystem for the OPS node applied to a ring network has two inputs/outputs, the optical switch is required to have twice as many ports as the number of inputs/outputs for bidirectional communication. Further, as illustrated in FIG. 3, in an optical switch subsystem for OPS nodes applied to a mesh-like network, the optical switch is required to have "number of paths" times as many ports as the number of inputs/outputs.

CITATION LIST

Patent Literature

[PTL 1] Japanese Patent Application Publication No. H6-59294

Non Patent Literature

[NPL 1] Hiroaki Harai et al., "Optical Packet and Circuit Integrated Networks and Software Defined Networking Extension", Journal of Lightwave Technology, Aug. 15, 2014, vol. 32, no. 16, pp. 2751-2759

SUMMARY OF THE INVENTION

An object of the present invention is to provide a low-loss optical switch device with a smaller number of ports for an optical switch in a network and node device capable of transmitting OCS-type and OPS-type optical signals.

In order to achieve such an object, one embodiment of the present invention provides an optical switch device provided in a node device constituting a network and having a plurality of optical input ports and a plurality of optical output ports, including: a high-speed add/drop optical switch composed of a plurality of optical switches, the optical switch having an optical waveguide structure made of a material whose refractive index or absorption coefficient changes on the order of nanoseconds, and the optical switch changing the refractive index or the absorption coefficient to perform switching of both OCS optical signals, which are optical-circuit-switching-type optical signals, and OPS optical signals, which are optical-packet-switching-type optical signals; and a plurality of circulators connected to an input port and an output port of the high-speed add/drop optical switch.

DESCRIPTION OF EMBODIMENTS

Hereinafter, embodiments of the present invention will be described in detail with reference to the drawings.
(Optical Switch)

A high-speed optical switch used for switching OPS-type optical signals will be described. As the switching mechanism, a distribution selective optical switch illustrated in FIG. 4 and an MZI-type optical switch illustrated in FIG. 5 are used.

Figure 1:
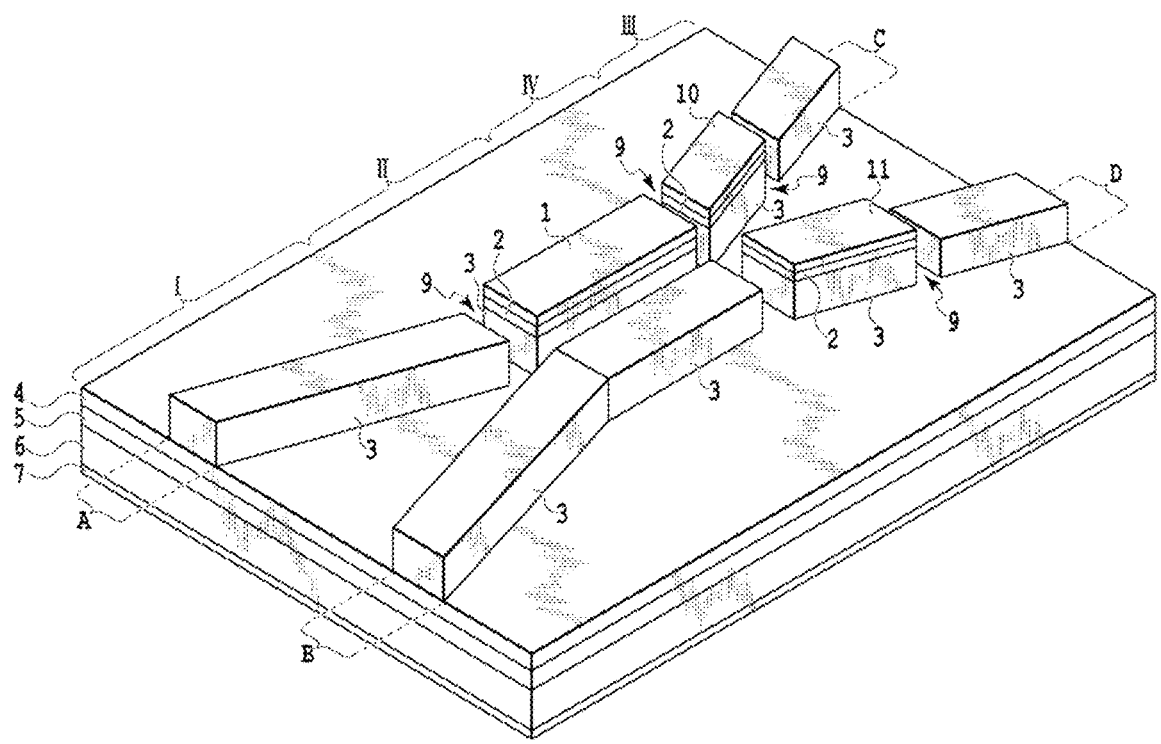
FIG. 1 is a perspective view illustrating a conventional 2×2 optical switch element.
Figure 2:
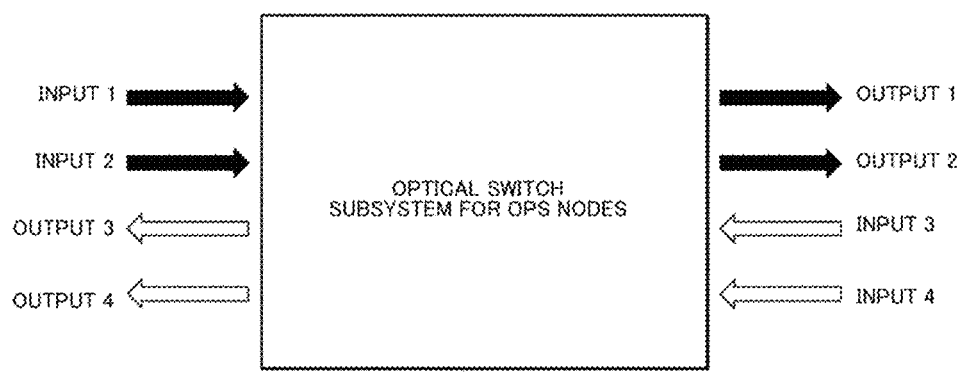
FIG. 2 illustrates an optical switch subsystem for OPS nodes applied to a ring network.
Figure 3:
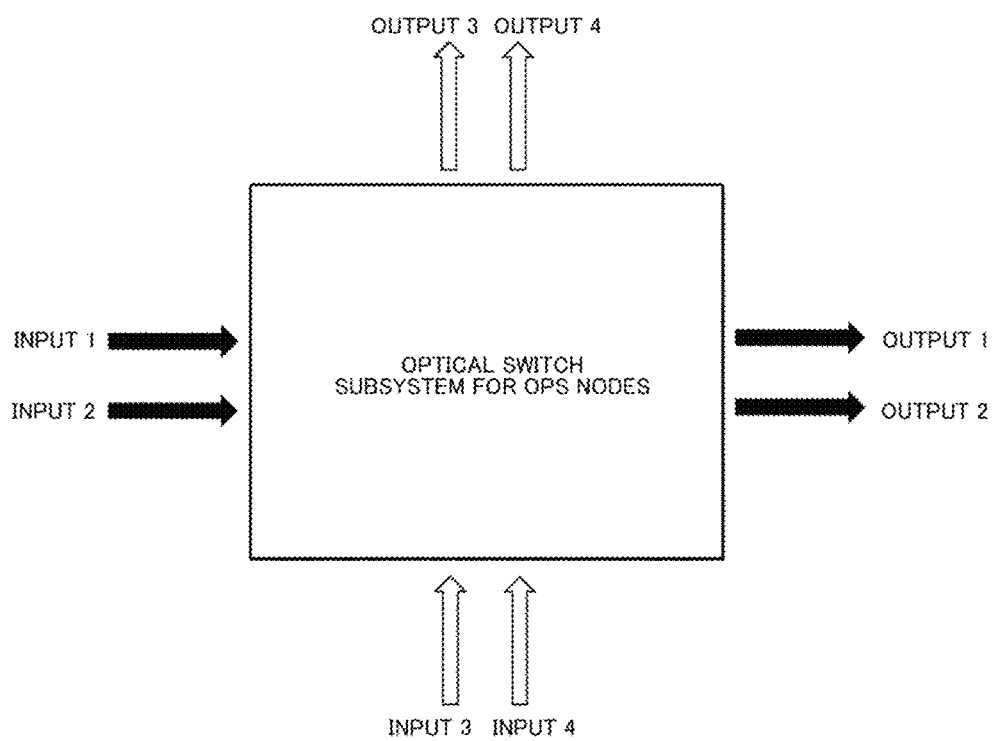
FIG. 3 illustrates an optical switch subsystem for OPS nodes applied to a mesh-like network.
Figure 4:
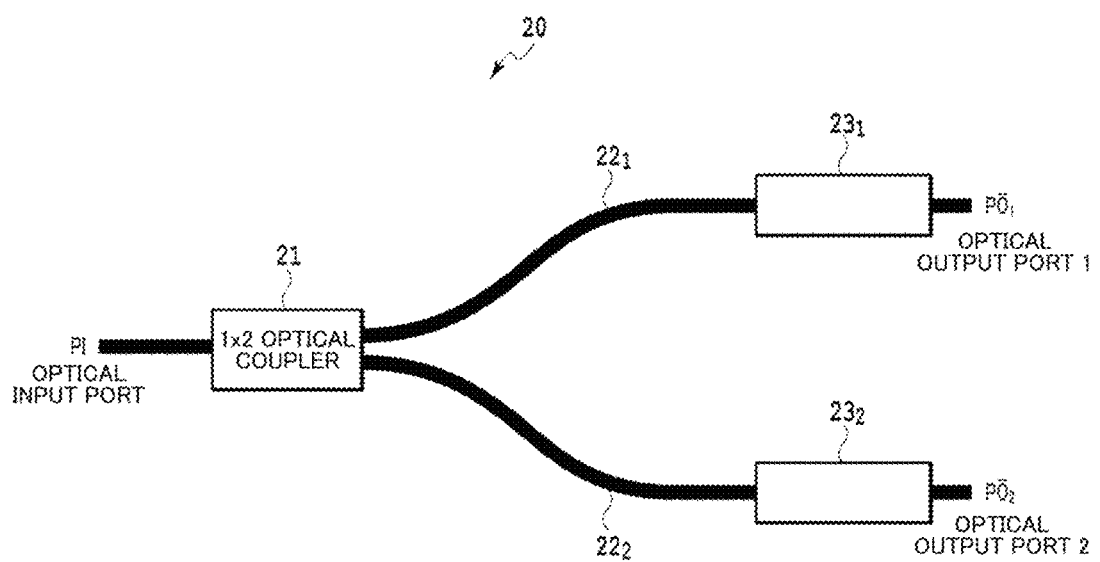
FIG. 4 is a diagram illustrating a distribution selective optical switch according to an embodiment of the present invention.
Figure 5:
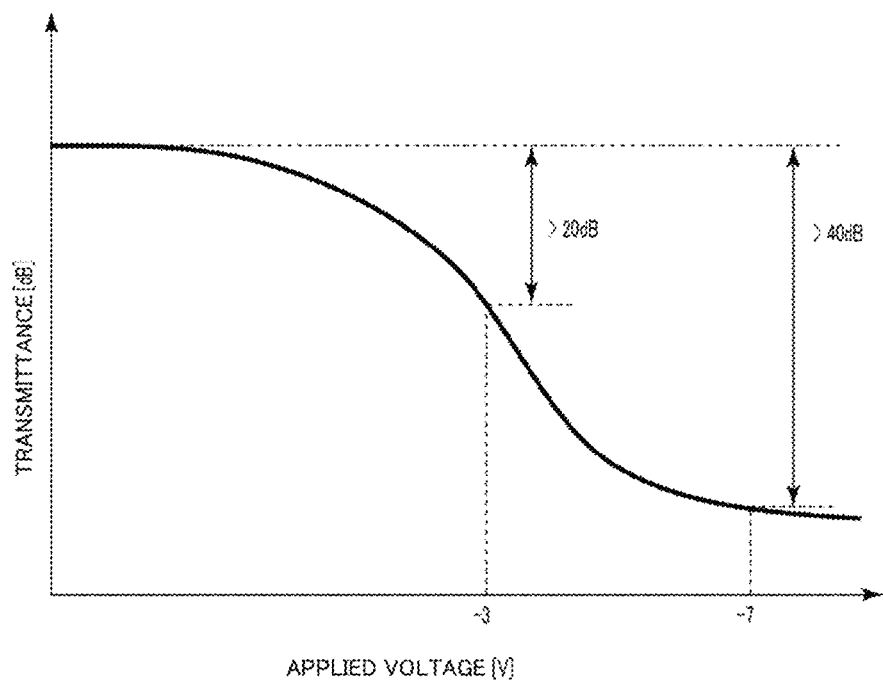
FIG. 5 is a diagram illustrating the transmittance of the distribution selective optical switch of the present embodiment.

FIG. 4 illustrates a distribution selective optical switch according to an embodiment of the present invention. A distribution selective optical switch 20 has a 1×2 optical switch configuration in which an input light input from an input port PI is branched into two optical waveguides $22_1$ and $22_2$ using a 1×2 optical coupler 21 which is a multi-mode interference (MMI) optical coupler, and the two optical waveguides $22_1$ and $22_2$ are connected to light absorption gates $23_1$ and $23_2$ having optical output ports $PO_1$ and $PO_2$.

As will be described later, the light absorption gates $23_1$ and $23_2$ have an n-InP substrate, an n-InP lower clad layer, an InGaAsP core layer, a p-InP upper clad layer, and a p+-InGaAs cap layer. The light absorption gates $23_1$ and $23_2$ have grounded n-type electrodes (potential=0 V) provided on the n-InP substrate. When a negative voltage is applied to the p-type electrodes provided on the light absorption gates $23_1$ and $23_2$, the absorption edge in the InGaAsP core layer shifts due to the Franz-Keldysh (FK) effect, and the absorption coefficient at the signal light wavelength propagating through the light absorption gates $23_1$ and $23_2$ increases.

In this way, by controlling the voltage applied to the light absorption gates $23_1$ and $23_2$, the light of one of the optical waveguides $22_1$ and $22_2$ that does not require output is absorbed by one of the corresponding light absorption gates $23_1$ and $23_2$, whereby switching is performed. Here, SOA or the like may be used for the EAM used as the light absorption gate.

FIG. 5 illustrates the transmittance of the distribution selective optical switch of the present embodiment. When EAM is used for the light absorption gates $23_1$ and $23_2$, for example, an extinction ratio of 20 dB or more can be obtained at an applied voltage of −3 V, and an extinction ratio of 40 dB or more can be obtained at an applied voltage of −7 V.

Further, the distribution selective optical switch illustrated in FIG. 4 can be configured not only as a 1×2 optical switch but also as a 1×N optical switch by increasing the number of branches. Assuming that J is an integer of 2 or more, when a 1×J optical switch having a 1×J port configuration is used, the optical switch is composed of a 1×J optical coupler and J light absorption gates.

Figure 6:
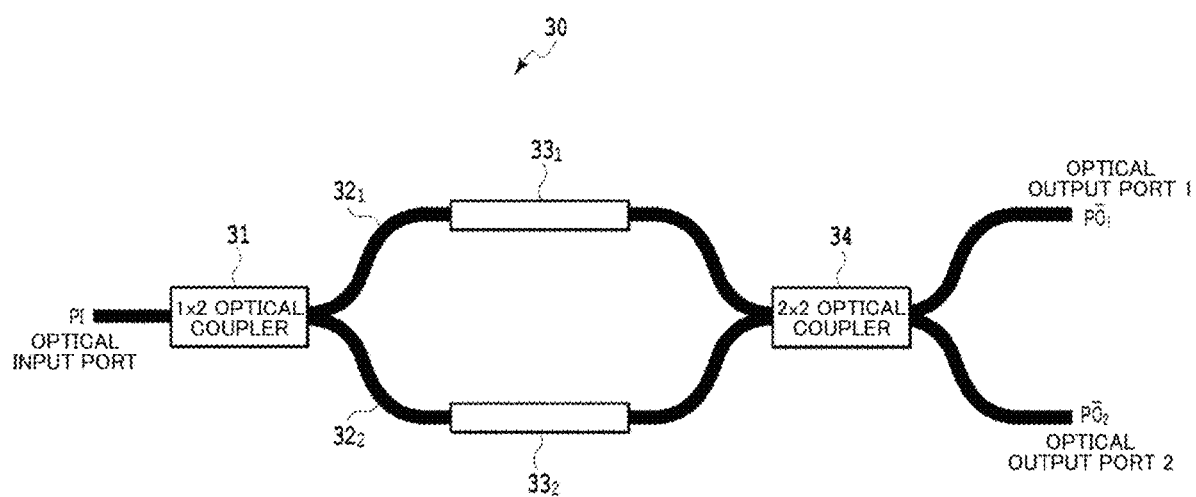
FIG. 6 is a diagram illustrating an MZI-type optical switch according to an embodiment of the present invention.

FIG. 6 illustrates an MZI-type optical switch according to an embodiment of the present invention. An MZI-type optical switch 30 branches the input light input from the optical input port PI into two arm optical waveguides $32_1$ and $32_2$ using a 1×2 optical coupler 31 which is an MMI optical coupler. The input light components branched into two paths are coupled using a 2×2 optical coupler 34, which is an MMI optical coupler, after receiving a phase difference by phase modulation controlled by control electrodes $33_1$ and $33_2$ in the arm optical waveguides $32_1$ and $32_2$.

In this way, the input signal light is output from one of the optical output ports $PO_1$ and $PO_2$ if the phase difference between the two arm optical waveguides $32_1$ and $32_2$ is ±nπ due to the interference effect, and is output from the other of the optical output ports $PO_1$ and $PO_2$ if the phase difference is ±(2n+1)π/2. Note that n is an integer of 0 or more. Therefore, if a phase modulation region is arranged in one of the arm optical waveguides $32_1$ and $32_2$ and is controlled, a 1×2 switching operation is obtained.

In order to obtain the above-mentioned phase modulation, the refractive indexes of the arm optical waveguides $32_1$ and $32_2$ may be changed. In the InP-based optical waveguide, the refractive index of the optical waveguide is changed using the FK effect and QCSE effect by application of a voltage or the plasma effect by current injection. In the LN-based optical waveguide, the refractive index of the optical waveguide is changed using the Pockels effect by application of a voltage. In this way, a switching operation can be performed. Further, as the MMI optical coupler that divides the light intensity into two equal parts, a directional coupler or the like may be used.

Figure 7:
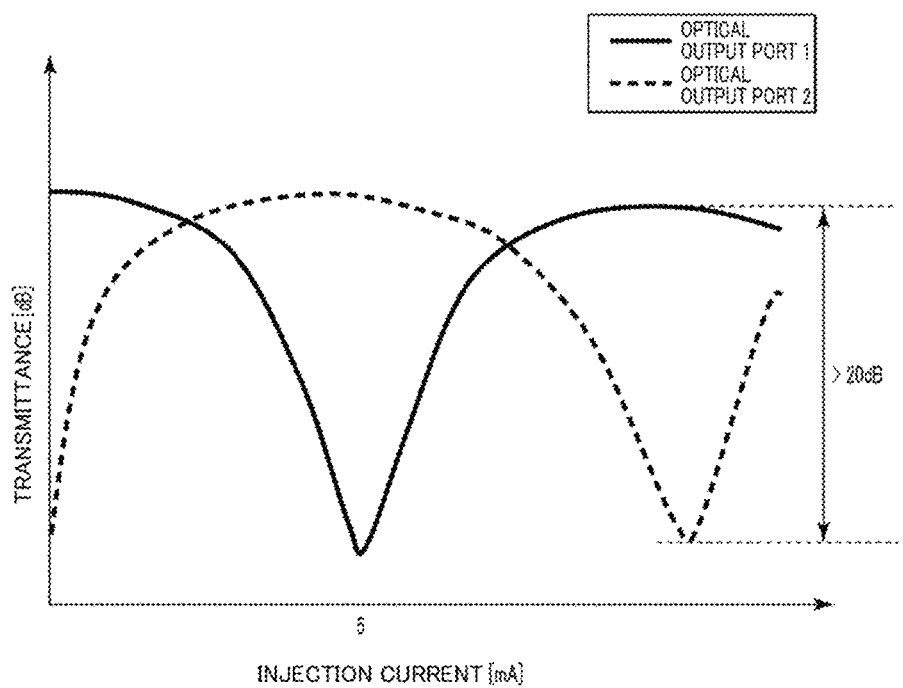
FIG. 7 is a diagram illustrating the transmittance of the MZI-type optical switch of the present embodiment.

FIG. 7 illustrates the transmittance of the MZI-type optical switch of the present embodiment. When the injection current into the two arm optical waveguides $32_1$ and $32_2$ is 0 mA, the input signal light is output to the optical output port $PO_1$ in FIG. 6. When a current is injected into either one of the control electrodes $33_1$ and $33_2$, the refractive index of the injected arm optical waveguide changes, and the phase of the propagating light changes. When the injection current into the arm optical waveguide is about 5 mA, the output from the optical output port $PO_1$ is minimized, and the optical output to the optical output port $PO_2$ is maximized. At this time, the ratio of the optical output to the optical output port $PO_1$ and the optical output to the optical output port $PO_2$ is 20 dB or more.

Figure 8:
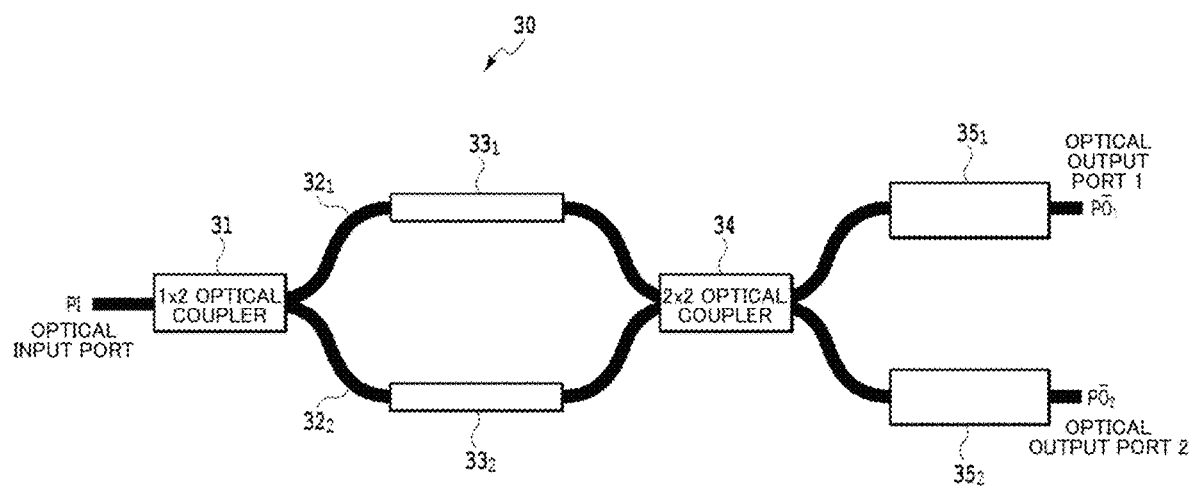
FIG. 8 is a diagram illustrating a modified example of the MZI-type optical switch of the present embodiment.

FIG. 8 illustrates a modified example of the MZI-type optical switch of the present embodiment. In the case of the MZI-type optical switch 30, since it is difficult to improve the extinction ratio of the optical output ports $PO_1$ and $PO_2$, the light absorption gates $35_1$ and $35_2$ used in the distribution selective optical switch may be added to the optical output ports $PO_1$ and $PO_2$.

Further, in the case of the MZI-type optical switch 30 illustrated in FIG. 6, a 1×N optical switch can be configured by connecting not only one stage of MZI but also a plurality of stages of MZI in a tree shape. Assuming that J is an integer of 2 or more, when a 1×J optical switch having a 1×J port configuration is used, the port on the input side of the 1×2 MZI-type optical switch 30 in the subsequent stage is connected to each of the two ports on the output side of the 1×2 MZI-type optical switch 30 in the previous stage. When a 2×2 MZI-type optical switch described later is used, one of the two ports on the input side of the 2×2 MZI-type optical switch in the subsequent stage is connected to each of the two ports on the output side of the 2×2 MZI-type optical switch in the previous stage.

(Optical Switch Manufacturing Method)

Next, a method of manufacturing the distribution selective optical switch 20 which is an optical switch capable of high-speed operation will be described. An n-InP lower clad layer, a bulk i-InGaAsP core layer having a 1.4 Q composition and a thickness of 0.3 μm, a p-InP upper clad layer, and a p+-InGaAsP cap layer are grown on the n-InP substrate by the organic metal vapor phase growth epitaxy (MOVPE).

Subsequently, by photolithography and dry etching, an input optical waveguide having a high-mesa optical waveguide structure, a 1×2 optical coupler 21, optical waveguides $22_1$ and $22_2$, light absorption gates $23_1$ and $23_2$, and an output optical waveguide are collectively formed. After forming the optical waveguide structure, benzocyclobutene (BCB), which is an organic material that can be embedded in a local region and is excellent in flattening, is applied by spin coating, and etching back is performed by reactive ion etching (RIE) using a mixed gas of $O_2/C_2F_6$ until the substrate surface is exposed to flatten the substrate surface.

Lastly, a p-type electrode is formed on the p+-InGaAsP cap layer of the light absorption gates $23_1$ and $23_2$ and the 1×2 optical coupler 21, and an n-type electrode is formed on the back surface of the n-InP substrate or the region of the substrate where the optical waveguide structure is not formed.

As described above, MOVPE growth and formation of the optical waveguide structure can be performed collectively. Further, unlike the conventional optical switch element, the process of removing the n-InP upper clad layer and the p+-InGaAsP cap layer between the 1×2 optical coupler 21 and the light absorption gates $23_1$ and $23_2$ is not necessary. Therefore, it is possible to provide an optical switch element having extremely low optical crosstalk without deteriorating optical characteristics with a simple manufacturing method.

Figure 9:
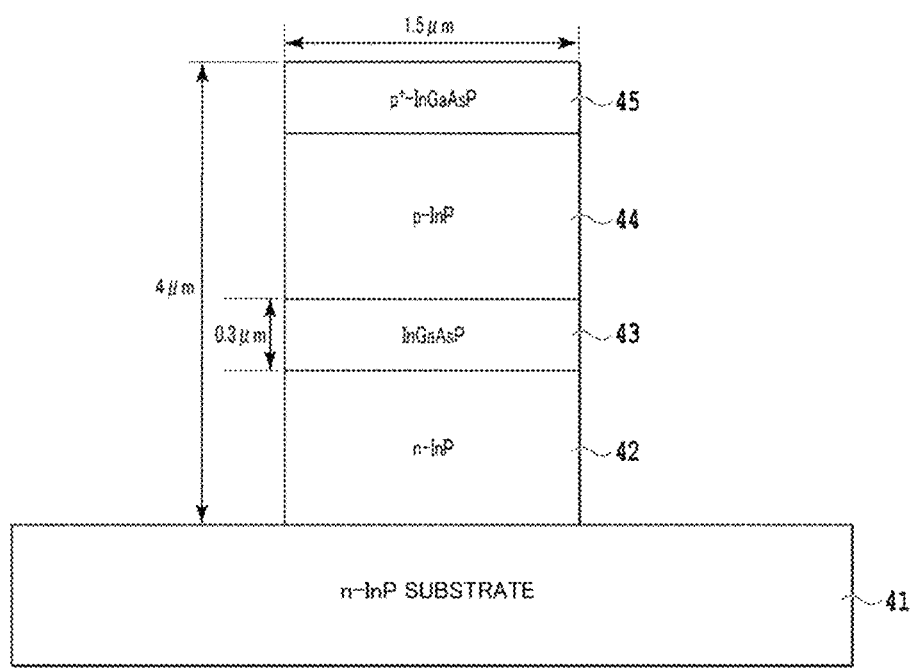
FIG. 9 is a cross-sectional view illustrating the configuration of an optical waveguide of the distribution selective optical switch of the present embodiment.

FIG. 9 illustrates the configuration of an optical waveguide of the distribution selective optical switch of the present embodiment. An n-InP lower clad layer 42, an InGaAsP core layer 43, a p-InP upper clad layer 44, and a p+-InGaAsP cap layer 45 are laminated in this order on an n-InP substrate 41. The InGaAsP core layer 43 is made of a bulk i-InGaAsP having a thickness of 0.3 μm, a width of 1.5 μm and a 1.4 Q composition. These design values are important parameters that determine the optical characteristics of the optical switch element.

In order to operate with an input signal light wavelength of, for example, 1.53 μm to 1.57 μm, and to realize low loss, high speed, and low power consumption operation, it is preferable that the following conditions are satisfied.

(1) The thickness of the InGaAsP core layer 43 is preferably in the range of 0.1 μm to 0.4 μm to satisfy the conditions that the input signal light is guided in a single mode and that sufficient light confinement in the InGaAsP core layer 43 is realized.

(2) The width of the InGaAsP core layer 43 is preferably in the range of 0.8 μm to 3 μm to satisfy the condition that the input signal light is guided in a single mode.

(3) The composition of the InGaAsP core layer 43 is preferably in the range of 1.3 Q to 1.5 Q, and each electrode length is preferably in the range of 100 μm to 2000 μm in the case of EAM and 50 μm to 1000 μm in the case of MZI.

In the optical switch of the present embodiment, it has been described that a bulk layer is used as the InGaAsP core layer 43 of the light absorption gates 23₁ and 23₂, but an MQW structure may be used. In that case, a high-efficiency extinction ratio is achieved by the QCSE effect. Further, although a high-mesa optical waveguide structure is used as the optical waveguide structure, the optical waveguide structure may be manufactured as other structures, for example, a ridge-type optical waveguide structure. Alternatively, an embedded optical waveguide structure or a rib-type optical waveguide structure in which both sides of the InGaAsP core layer are embedded with semiconductors may be used.

Although the optical switch in the present embodiment has been described using an InP-based compound semiconductor, a GaAs-based compound semiconductor may be used. Further, a material system such as a silicon thin wire optical waveguide may be used. In the optical waveguide structure using these materials, a change in the refractive index or absorption coefficient on the order of nanoseconds can be obtained, and such a high-speed change enables high-speed switching of OCS optical signals and OPS optical signals.

(Node Device)

Figure 10:
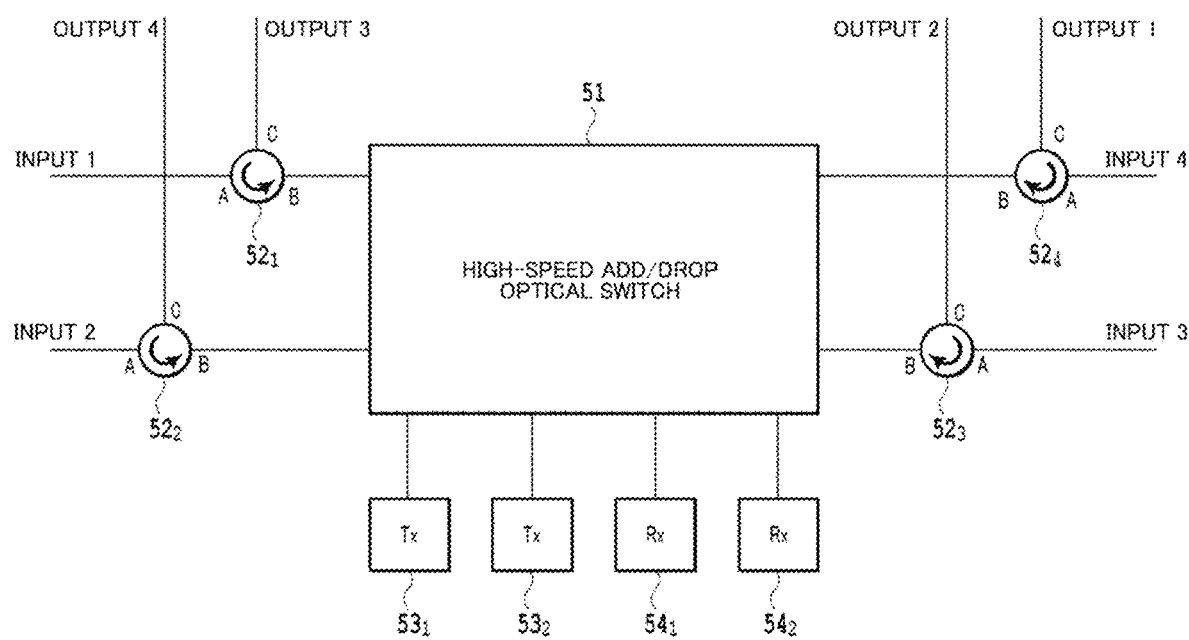
FIG. 10 is a diagram illustrating a configuration of a node device according to an embodiment of the present invention.

FIG. 10 illustrates the configuration of the node device according to the embodiment of the present invention. As an optical switch subsystem applied to a node device, a configuration of a high-speed add/drop optical switch having 4 inputs and 4 outputs will be described. The two inputs and two outputs of the high-speed add/drop optical switch 51 are transmission signal lines connected from another pair of nodes to the other pair of nodes. The other two inputs and two outputs are connected to transmitters $53_1$ and $53_2$ and receivers $54_1$ and $54_2$. Circulators $52_1$ to $52_4$ are arranged on the transmission signal lines connected to the high-speed add/drop optical switch 51, respectively, and the input/output of the high-speed add/drop optical switch and the input/output to the transmission signal lines are selected. The connections of the ports of the circulators $52_1$ to $52_2$ are A→B→C→A, the light input from A is output to B, the light input from B is output to C, and the light input from C is output to A.

The signal light input to the node device will be described. The light input from input 1 passes through the circulator $52_1$ and is input to the high-speed add/drop optical switch 51. The signal dropped by the high-speed add/drop optical switch 51 is connected to the receivers $54_1$ and $54_2$, and the passed signal is input to the circulator $52_4$ connected to input 4 and output from output 1. As for the light input from input 4 in the opposite direction, the signal to be dropped is connected to the receivers $54_1$ and $54_2$, and the signal to be passed through is output from output 4.

(High-Speed Add/Drop Optical Switch)

Figure 11:
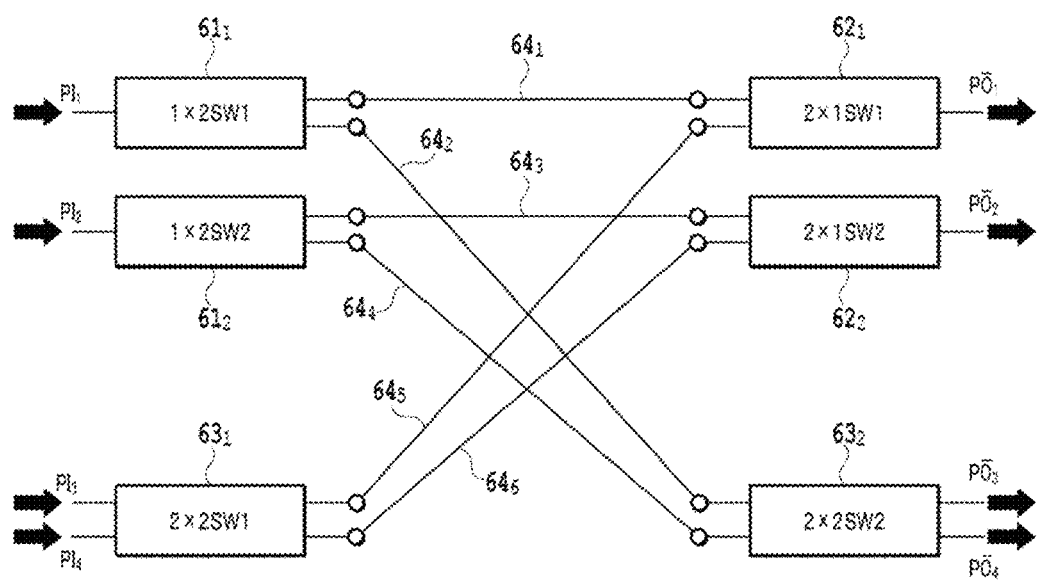
FIG. 11 is a diagram illustrating a configuration of a high-speed add/drop optical switch according to an embodiment of the present invention.

FIG. 11 illustrates a configuration of a high-speed add/drop optical switch according to an embodiment of the present invention. The high-speed add/drop optical switch is an optical switch device having four input ports $PI_1$ to $PI_4$ and four output ports $PO_1$ to $PO_4$, and can transmit OCS optical signals and OPS optical signals at the same time. Two 1×2 optical switches $61_1$, $61_2$ and two 2×1 optical switches $62_1$ and $62_2$ are used for the add/drop between the OCS optical signal and the OPS optical signal (first optical switch unit). Two 2×2 optical switches $63_1$, $63_2$ are used for the add/drop of OPS signals (second optical switch unit).

The optical input port $PI_1$ is connected to the input side of the 1×2 optical switch $61_1$, the optical input port $PI_2$ is connected to the input side of the 1×2 optical switch $61_2$, and the optical input ports $PI_3$ and $PI_4$ are connected to the input side of the 2×2 optical switch $63_1$. Further, the optical output port $PO_1$ is connected to the output side of the 2×1 optical switch $62_1$, the optical output port $PO_2$ is connected to the output side of the 2×1 optical switch $62_2$, and the optical output ports $PO_3$ and $PO_4$ are connected to the output side of the 2×2 optical switch $63_2$.

One optical output port of the 1×2 optical switch $61_1$ is connected to one optical input port of the 2×1 optical switch $62_2$ by an optical fiber $64_1$. The other optical output port of the 1×2 optical switch $61_1$ is connected to one optical input port of the 2×2 optical switch $63_2$ by an optical fiber $64_2$. Further, one optical output port of the 1×2 optical switch $61_2$ is connected to one optical input port of the 2×1 optical switch $62_2$ by an optical fiber $64_3$. The other optical output port of the 1×2 optical switch $61_2$ is connected to the other optical input port of the 2×2 optical switch $63_2$ by an optical fiber $64_4$. Further, one optical output port of the 2×2 optical switch $63_1$ is connected to the other optical input port of the 2×1 optical switch $62_1$ by an optical fiber $64_5$. The other optical output port of the 2×2 optical switch $63_1$ is connected to the other optical input port of the 2×1 optical switch $62_2$ by an optical fiber $64_6$.

By adopting the distribution selective optical switch 20 illustrated in FIG. 4 or the MZI-type optical switch 30 illustrated in FIG. 6 as the 1×2 optical switches $61_1$ and $61_2$ and the 2×1 optical switches $62_1$ and $62_2$, switching between OCS optical signals and OPS optical signals at high speed can be performed.

Figure 12:
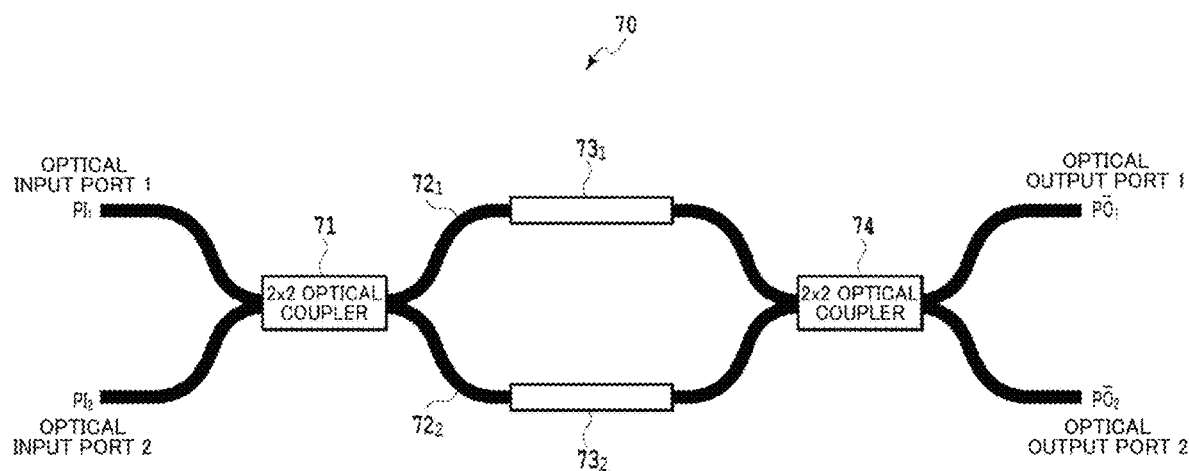
FIG. 12 is a diagram illustrating a configuration of a 2×2 optical switch applied to the high-speed add/drop optical switch of the present embodiment.

FIG. 12 illustrates the configuration of a 2×2 optical switch applied to the high-speed add/drop optical switch of the present embodiment. In an MZI-type optical switch 70, a 2×2 optical coupler 71, which is an MMI optical coupler connected to the two optical input ports $PI_1$ and $PI_2$, and a 2×2 optical coupler 74, which is an MMI optical coupler connected to the two optical output ports $PO_1$ and $PO_2$ are connected by two arm optical waveguides $72_1$ and $72_2$ provided with control electrodes $73_1$ and $73_2$ for phase control, respectively.

Figure 13:
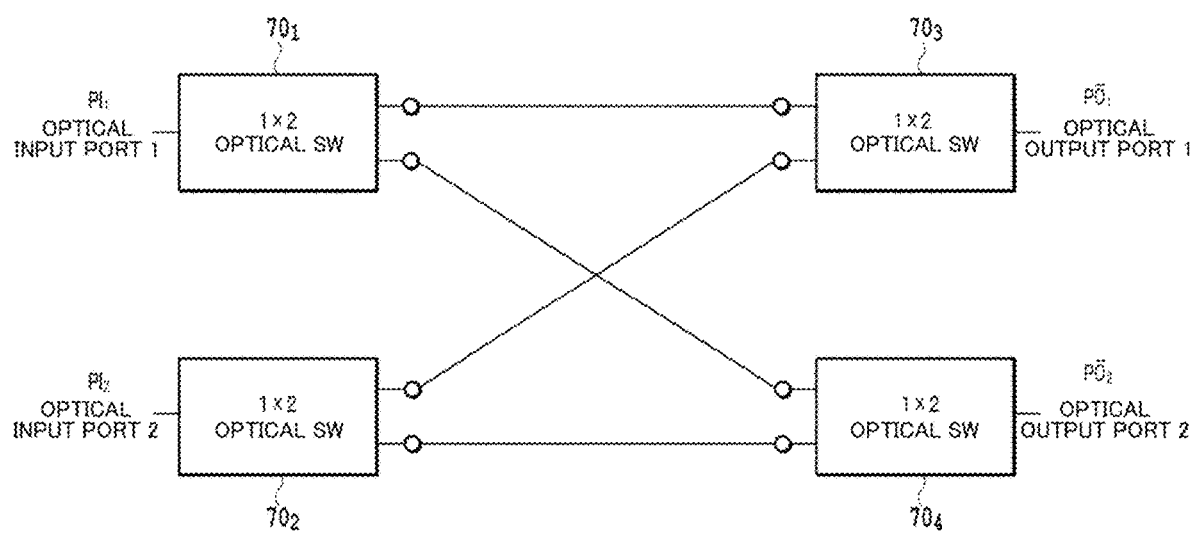
FIG. 13 is a diagram illustrating a configuration of a 2×2 optical switch applied to the high-speed add/drop optical switch of the present embodiment.

FIG. 13 illustrates another example of a 2×2 optical switch applied to the high-speed add/drop optical switch of the present embodiment. Four 1×2 optical switches $70_1$ to $70_4$ that employ the distribution selective optical switch 20 illustrated in FIG. 4 or the MZI-type optical switch 30 illustrated in FIG. 6 may be connected to face each other to form a 2×2 optical switch.

By adopting a 2×2 optical switch in which 1×2 distribution selective optical switches are connected to face each other, OPS signals can be processed at a high speed. Further, since it is difficult to improve the extinction ratio of the MZI-type optical switch, the optical switch may be combined with an optical gate used in the distribution selective optical switch.

In the optical switch according to the present embodiment, the switching elements of the 1×2 optical switch, the 2×1 optical switch, and the 2×2 optical switch may be manufactured as individual chips or modules, and the chips or modules may be connected by optical fibers. Alternatively, the switching elements may be monolithically integrated on the same chip, and the switching elements may be connected by optical waveguides.

Figure 14:
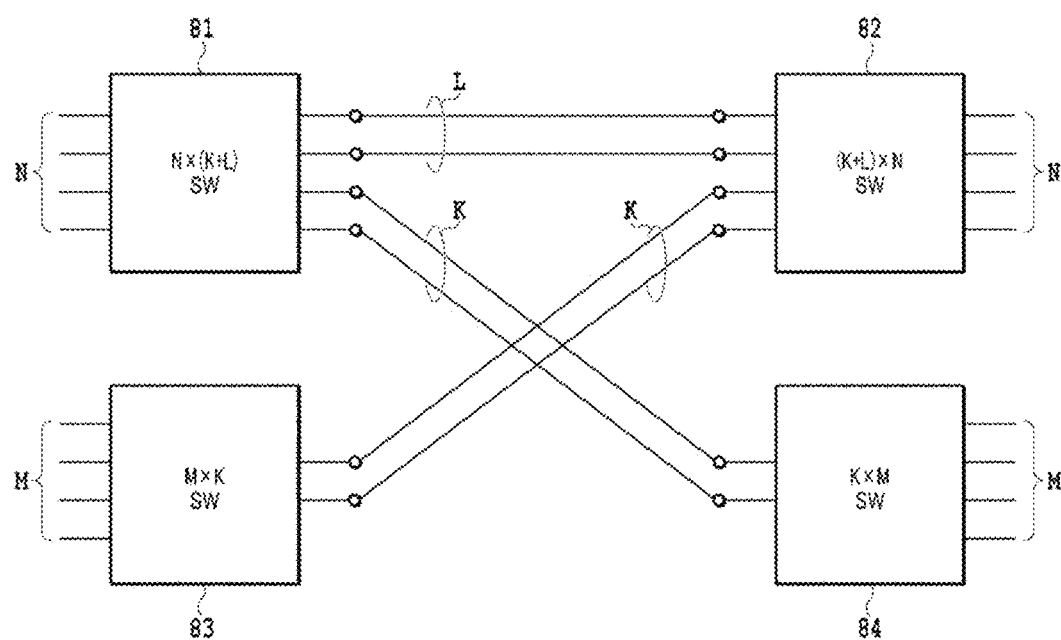
FIG. 14 is a diagram illustrating a high-speed add/drop optical switch applied to a multi-input, multi-output node device.

In the present embodiment, an example of a high-speed add/drop optical switch applied to a node device having 4 inputs and 4 outputs has been described. Further, a case where the high-speed add/drop optical switch is applied to a node device having a large number of input and output ports will be described. FIG. 14 illustrates a high-speed add/drop optical switch applied to a multi-input, multi-output node device. Assuming that K, L, M, and N are integers of 1 or more, L ports are used for cut-through of OCS optical signals and K ports are used for add/drop of OPS optical signals. An N×(K+L) optical switch 81 and a (K+L)×N optical switch 82 are used for the add/drop between OCS optical signals and OPS optical signals (first optical switch unit). Two K×M optical switches 83 and 84 are used for the add/drop of OPS signals (second optical switch unit).

N ports are used for the input/output of the optical switch for the add/drop of OCS optical signals and OPS optical signals, but the switch may be divided into N as one port. In that case, it is necessary to match the total numbers of K ports and L ports. Further, a light absorption gate may be provided after the N×(K+L) optical switch.

(Control of High-Speed Add/Drop Optical Switch)

When the high-speed add/drop optical switch is controlled according to the control of a network controller, assuming that a 1×2 optical switch and a 2×1 optical switch are used for switching to preset ports, the high-speed switching of OPS optical signals is performed by the 2×2 optical switch. Specifically, the label of the OPS signal is read immediately before the 2×2 optical switch $63_1$ and the 2×2 optical switch $63_2$, and switching is performed on the basis of the label table. Since the OCS optical signal that is not dropped is cut through and transmitted as it is, it can be transmitted without delay or loss.

According to the present embodiment, a 1×2 optical switch and a 2×1 optical switch dedicated for the add/drop between OCS optical signals and OPS optical signals are introduced into the WSS-based ROADM, and a high-speed optical switch is arranged after the wavelength selective switch. In this way, it is possible to handle both OCS and OPS signals without any disadvantages to OCS optical signals. Furthermore, by optimizing the number of ports of each optical switch and the optical fiber connection to a network configuration, it is possible to configure a node device that suppresses the loss, which is the disadvantage of the high-speed optical switch.

The invention claimed is:

1. An optical switch device provided in a node device constituting a network and having a plurality of optical input ports and a plurality of optical output ports, comprising:
   a high-speed add/drop optical switch composed of a plurality of optical switches, the optical switch having an optical waveguide structure made of a material whose refractive index or absorption coefficient changes on the order of nanoseconds, and the optical switch changing the refractive index or the absorption coefficient to perform switching of both Optical-Circuit-Switching (OCS) optical signals and Optical-Packet-Switching (OPS) optical signals and
   a plurality of circulators connected to an input port and an output port of the high-speed add/drop optical switch, wherein
   the node device is a Reconfigurable Optical Add Drop Multiplexer (ROADM) node device having a wavelength selective switch,
   the high-speed add/drop optical switch is arranged after the wavelength selective switch and includes:
   a first optical switch unit composed of a plurality of optical switches that switches the OCS optical signals and the OPS optical signals to a first preset optical output port and perform an add/drop process between the OCS optical signals and the OPS optical signals; and
   a second optical switch unit composed of a plurality of optical switches that switches the OPS optical signals to the first preset optical output port of the first optical switch unit and performs an add/drop process on the OPS optical signals,
   wherein the first optical switch unit switches the OPS optical signals to a second preset optical port of the second optical switch unit.

2. The optical switch device according to claim 1, further comprising:
   a network controller that controls switching in the first optical switch unit; and
   a label table that controls switching in the second optical switch unit on the basis of labels of the OPS optical signals.

3. The optical switch device according to claim 2, wherein if K, L, M, and N are integers of 1 or more,
   the first optical switch unit includes an N×(K+L) optical switch having an N×(K+L) port configuration and a (K+L)×N optical switch having a (K+L)×N port configuration,
   the second optical switch unit includes an M×K optical switch having an M×K port configuration and a K×M optical switch having a K×M port configuration,
   L ports on an output side of the N×(K+L) optical switch are connected to L ports on an input side of the (K+L)×N optical switch, and K ports on the output side of the N×(K+L) optical switch are connected K ports on the input side of the K×M optical switch, and
   K ports on the output side of the M×K optical switch are connected to K ports on the input side of the (K+L)×N optical switch.

4. The optical switch device according to claim 1, wherein if K, L, M, and N are integers of 1 or more,
   the first optical switch unit includes an N×(K+L) optical switch having an N×(K+L) port configuration and a (K+L)×N optical switch having a (K+L)×N port configuration,
   the second optical switch unit includes an M×K optical switch having an M×K port configuration and a K×M optical switch having a K×M port configuration,
   L ports on an output side of the N×(K+L) optical switch are connected to L ports on an input side of the (K+L)×N optical switch, and K ports on the output side of the N×(K+L) optical switch are connected K ports on the input side of the K×M optical switch, and
   K ports on the output side of the M×K optical switch are connected to K ports on the input side of the (K+L)×N optical switch.

5. The optical switch device according to claim 4, wherein if J is an integer of 2 or more,
   the N×(K+L) optical switch, the (K+L)×N optical switch, the M×K optical switch, and the K×M optical switch are respectively 1×J optical switches having a 1×J port configuration, and at least one of the 1×J optical switches is composed of an 1×J optical coupler and J light absorption gates.

6. The optical switch device according to claim 5, wherein a light absorption gate is provided after the N×(K+L) optical switch.

7. The optical switch device according to claim 5, wherein
the N×(K+L) optical switch and the (K+L)×N optical switch, the N×(K+L) optical switch and the K×M optical switch, and the M×K optical switch and the (K+L)×N optical switch are connected by an optical waveguide, and
the N×(K+L) optical switch, the (K+L)×N optical switch, the M×K optical switch, the K×M optical switch, and the optical waveguide are monolithically integrated on the same chip.

8. The optical switch device according to claim 4, wherein if J is an integer of 2 or more,
the N×(K+L) optical switch, the (K+L)×N optical switch, the M×K optical switch, and the K×M optical switch are respectively 1×J optical switches having a 1×J port configuration, and at least one of the 1×J optical switches has a configuration in which a plurality of 1×2 Mach-Zehnder interferometers or a plurality of 2×2 Mach-Zehnder interferometers are connected in multiple stages.

9. The optical switch device according to claim 8, wherein a light absorption gate is provided after the N×(K+L) optical switch.

10. The optical switch device according to claim 8, wherein
the N×(K+L) optical switch and the (K+L)×N optical switch, the N×(K+L) optical switch and the K×M optical switch, and the M×K optical switch and the (K+L)×N optical switch are connected by an optical waveguide, and
the N×(K+L) optical switch, the (K+L)×N optical switch, the M×K optical switch, the K×M optical switch, and the optical waveguide are monolithically integrated on the same chip.

11. The optical switch device according to claim 4, wherein a light absorption gate is provided after the N×(K+L) optical switch.

12. The optical switch device according to claim 4, wherein
the N×(K+L) optical switch and the (K+L)×N optical switch, the N×(K+L) optical switch and the K×M optical switch, and the M×K optical switch and the (K+L)×N optical switch are connected by an optical waveguide, and
the N×(K+L) optical switch, the (K+L)×N optical switch, the M×K optical switch, the K×M optical switch, and the optical waveguide are monolithically integrated on the same chip.

13. The optical switch device according to claim 11, wherein
the N×(K+L) optical switch and the (K+L)×N optical switch, the N×(K+L) optical switch and the K×M optical switch, and the M×K optical switch and the (K+L)×N optical switch are connected by an optical waveguide, and
the N×(K+L) optical switch, the (K+L)×N optical switch, the M×K optical switch, the K×M optical switch, and the optical waveguide are monolithically integrated on the same chip.

* * * * *